United States Patent [19]

Coldren

[11] 3,962,479

[45] June 8, 1976

[54] METHOD FOR TREATING WHOLE KERNELS OF FEED GRAIN

[76] Inventor: Kenneth M. Coldren, Rte. No. 2, P.O. Box 116, Colfax, Ill. 61728

[22] Filed: Oct. 15, 1974

[21] Appl. No.: 514,421

Related U.S. Application Data

[62] Division of Ser. No. 181,768, Sept. 20, 1971, Pat. No. 3,861,294.

[52] U.S. Cl. ............................. 426/532; 426/460; 426/462; 426/482; 426/507
[51] Int. Cl.$^2$............................................. A23L 3/00
[58] Field of Search ........... 426/462, 460, 507, 443, 426/459, 532, 482

[56] References Cited

UNITED STATES PATENTS

| | | | |
|---|---|---|---|
| 1,187,703 | 6/1916 | Boss | 426/462 |
| 2,355,810 | 8/1944 | Loewy | 426/507 |
| 2,412,153 | 12/1946 | Huzenlaub | 426/507 |
| 2,438,939 | 4/1948 | Ozai-Durrani | 426/141 |
| 3,851,085 | 11/1974 | Rodgers et al. | 426/507 |

Primary Examiner—Raymond N. Jones

[57] ABSTRACT

The disclosure relates to a method and apparatus for perforating the shells or husks of whole kernel feed grains such as shelled corn, grain sorghum, millet and the like, without shattering the kernels or destroying the germ, so that the moisture content of the treated grain can be rapidly altered.

The method comprises the steps of wetting the exterior of the kernels with water to partially plasticize the husk, treating the kernels so that the husks separate partially from the interior portion of the kernels in the form of blisters and then perforating the blisters. The treated kernels may then be subjected to other steps to attain a desired result.

Such steps may comprise heating the kernels to dry the grain for storage, wetting the grain to increase its moisture content preliminary to feeding it to animals; wetting it with liquid food supplements, antibiotics, etc., wetting it preparatory to controlled fermentation of the grain and the like.

20 Claims, 12 Drawing Figures

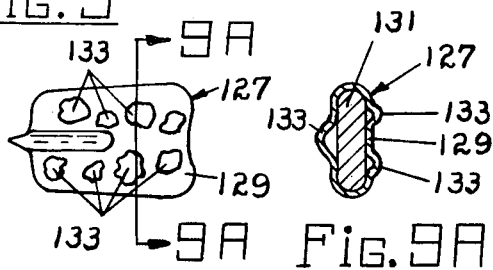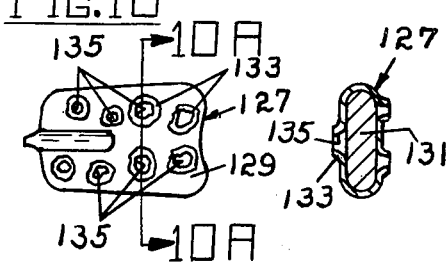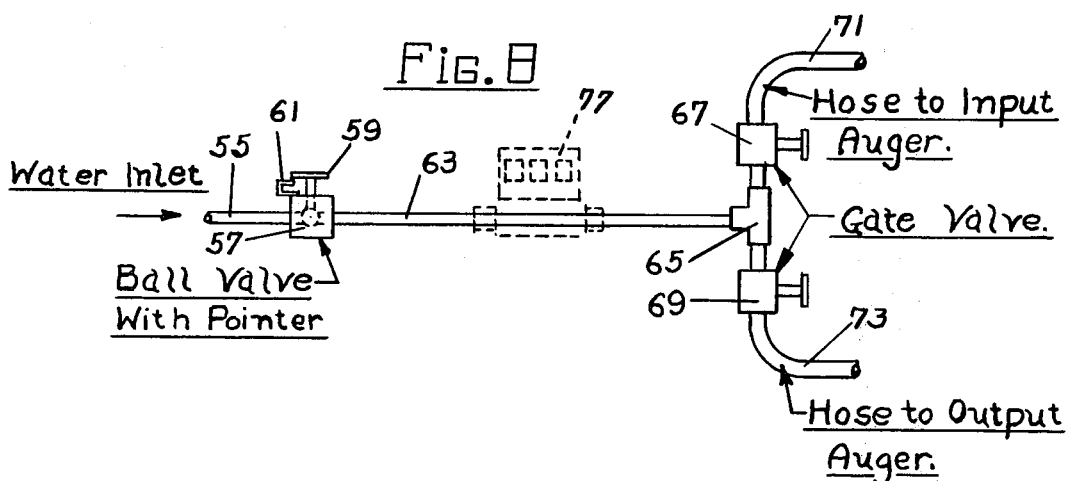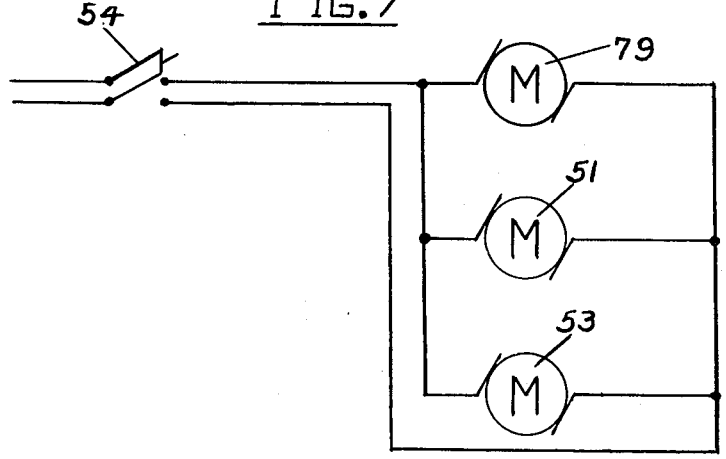

METHOD FOR TREATING WHOLE KERNELS OF FEED GRAIN

RELATED APPLICATION

This application is a division of my now co-pending U.S. application Ser. No. 181,768, filed Sept. 20, 1971, and entitled "Method and Apparatus for Treating Whole Feed Grain", now U.S. Pat. No. 3,861,294, issued Jan. 21, 1975.

BACKGROUND OF INVENTION

The invention relates to the field of animal feed grains and a method of treating them so as to enable the animal to assimilate a greater quantity of the nutrients contained in the grain.

The literature discloses studies and tests which relate to "reconstitution" of feed grains. The term is defined in a Texas A & M University press release No. 2565, dated June 1968, as "consisting of adding water to air-dry grain to increase its moisture content to 25–30 percent, followed by controlled fermentation in the absence of air."

The release describes feeding tests in 48 animals which were divided into 6 uniform groups. Two groups which served as "controls" were fed ground, dry sorghum grain. Two other groups were fed moist sorghum grain which was reconstituted in whole form and was ground just before feeding. The remaining two groups received sorghum grain which had been ground and reconstituted. The first and last mentioned groups had substantially the same daily gain whereas the groups fed with reconstituted whole grain decreased the feed required per unit of gain by 11%. The "reconstitution" process was stated to require at least 21 days before the grain could be fed, and also required air tight silos for commercial practice of the process.

The release also states that the exact changes which occur in grain during reconstitution are not well understood, but that the process "may be" similar to that which takes place during germination of the grain, which will be discussed further below.

The literature contains other, later experiments which are along the lines of those contained in Release No. 2565, and which generally corroborate the findings thereof.

For example, a report of tests by the North Florida Experiment Station, Quincy, Florida, dated Jan. 8, 1969, indicates that comparable results were attained by the same process using shelled corn instead of sorghum grain. Another report of tests, published at a "Beef Cattle Short Course" at Gainsville, Florida, dated May 1, 1969, indicates shelled corn should contain 22 to 30% moisture because with moisture levels below 22%, adequate fermentation and softening of the grain does not occur. It is noted that the later reports appear to define "reconstitution" as the addition of water to dry grain rather than this step AND the fermentation step combined, as defined by Release No. 2565. Since the latter definition appears to be more widely accepted, this specification uses the term to indicate the addition of water rather than both the addition of water and subsequent fermentation. The "Short Course" report also indicates that the fermentation process may be terminated after 10 days rather than 3 weeks, without material impairment of the benefits stated in the Release.

The Short Course report discusses a number of methods for "reconstituting" dry grain prior to fermentation: (1) Spraying water through nozzles onto grain passing through an auger which has its discharge end elevated; (2) Immersion in a flooded pit from which the grain is removed by an auger; (3) A mixer truck; (4) A "reconstituter" in which grain is sprayed with water as it passes through; (5) Flooded on truck with perforated hose, to prevent water channeling down through grain and draining out of truck body before grain is wet; and (6) Water applied in blower as grain is put in structure (for fermentation).

Applicant's view of the state of the art is that all of the known methods for reconstituting grains, including the methods noted above, attempt to supply moisture to the interior of each kernel through the existing, naturally provided entrance channels, which occur in the germ area. The hull constitutes a natural "raincoat" which prevents absorption of water except in the germ area.

If, as suggested in Report No. 2565, the process of reconstitution is similar to that of germination, the first water absorbed would be taken up and held by the embryo, which produces an enzyme. The latter is conducted to the alourone layer which secretes a hydrolytic enzyme, which coacts with water in the starch matrix to convert or liquify the starch of the kernel. Thus, considerable time is required to absorb the required amount of water and to distribute it substantially uniformly throughout the interior of the kernel. As indicated above, the time period is on the order of 10 days, and since open air storage for such period could lead to deterioration or spoilage of the grain, air tight enclosure of the grain is necessary. Further, the air tight storage must be maintained during the entire feeding period to prevent uncontrolled fermentation.

The art cited during prosecution of the above identified parent application of which this application is a division, while teaching various types of methods and apparatus for treating feed grains, does not teach or suggest a method or apparatus wherein portions of the hulls of the kernels of feed grain are loosened from the interior portion of the kernels to cause the hulls to blister and thereafter opening the blisters to perforate the hulls.

SUMMARY OF THE INVENTION

Applicant's process provides relatively large openings in the hull of each kernel so as to expose relatively large areas of the internal parts of each kernel to the water which enters through these openings, so that the production of both enzymes starts substantially at once. Further, the starch matrix rapidly absorbs water and becomes uniformly wetted throughout so that the hydrolysis of the starch can proceed as soon as the hydrolytic enzyme is produced, which occurs almost immediately, in comparison with a day or more using the prior art methods for reconstitution.

Further, applicant's process does not shatter or break the kernels which would destroy the enzyme producing and distribution apparatus of the kernel and thereby would prevent the production and distribution of the enzymes which are necessary to the hydrolytic process.

The dwell time of the food in the stomach of the animal is the same whether dry or reconstituted grain is fed. Accordingly, since hydrolysis of the starch is already going on in grain which is reconstituted by applicant's method, and may even be nearing completion by the time it is fed to the animal, the digestion process of the animal will be able to extract a much higher percentage of the nutrients from the grain than it could extract from dry grain, which would have to remain in the stomach for a considerable time before the hydrolysis could even start.

As indicated in Release 2565, ground grain which was subjected to airless fermentation showed no advantages over ground dry grain, probably because the grinding destroyed the germination apparatus of the kernels.

Some of the benefits of applicant's process are those stated above. In addition, the reconstituted grain can be made up daily and fed immediately or within a reasonable time after its preparation, without materially altering the benefits. Air tight storage is eliminated.

It will be seen from the above that it is an object of this invention to provide a method for reconstituting feed grains so as to start hydrolysis of the starch thereof substantially immediately.

A further object of the invention is to cause such hydrolysis to continue at a rapid rate so that the reconstituted grain may be fed immediately or within a reasonable time after treatment, without loss of the benefits produced by the process.

Another object is to eliminate the necessity for air tight storage as a step of the process.

Yet another object of the invention is to provide a process in which reconstitution is effected by applying water directly into the interior of the kernels through relatively large perforations in the husks thereof, to wet the interior thoroughly and rapidly.

Still another object is to provide a process for reconstituting grain which includes the steps of wetting the exterior of the kernels so as to partially plasticize the hull, subjecting the kernels to numerous impacts to cause blistering of the hull, to thereafter open the blisters and applying water to the interior of the kernels through the openings.

A further object of the invention is to apply water to the grain to be reconstituted to plasticize the hulls, to apply additional water to the grain during the blistering and blister opening steps, or after such steps are completed.

Another object is to apply heat instead of water to the blistered and scarified grain to dry it for storage.

These and other objects will become apparent from a study of the following specification and the drawings which are attached hereto, which form a part hereof and in which:

FIG. 3 is a plan view of a portion of the upper surface of the impacting rotor showing the projections and their pattern of arrangement.

FIG. 4 is a cross sectional view of the structure of FIG. 3.

FIG. 5 is a plan view of a portion of the upper surface of the scarifying rotor showing the teeth thereof and a portion of the outer rim of the rotor which confines the scarifying element.

FIG. 6 is a sectional view of the scarifying rotor taken substantially on the line 6—6 of FIG. 5 and carried to the center of the rotor to show the means for mounting the rotor on the drive shaft.

FIG. 7 is a wiring diagram showing the electrical connections for the auger and rotor driving motors and the control switch.

FIG. 8 is a diagrammatic view of the water input and flow control system.

FIG. 9 is a sketch to illustrate the appearance of a blistered kernel of corn which is produced by the action of the rotor.

FIG. 9A is a sectional view of the kernel of FIG. 9 taken on the line 9A—9A.

FIG. 10 is a sketch to illustrate the appearance of a blistered kernel after the blisters have been opened by the scarifying rotor.

FIG. 10A is a sectional view taken on line 10A—10A of FIG. 10.

DESCRIPTION OF THE APPARATUS

Figure 1:
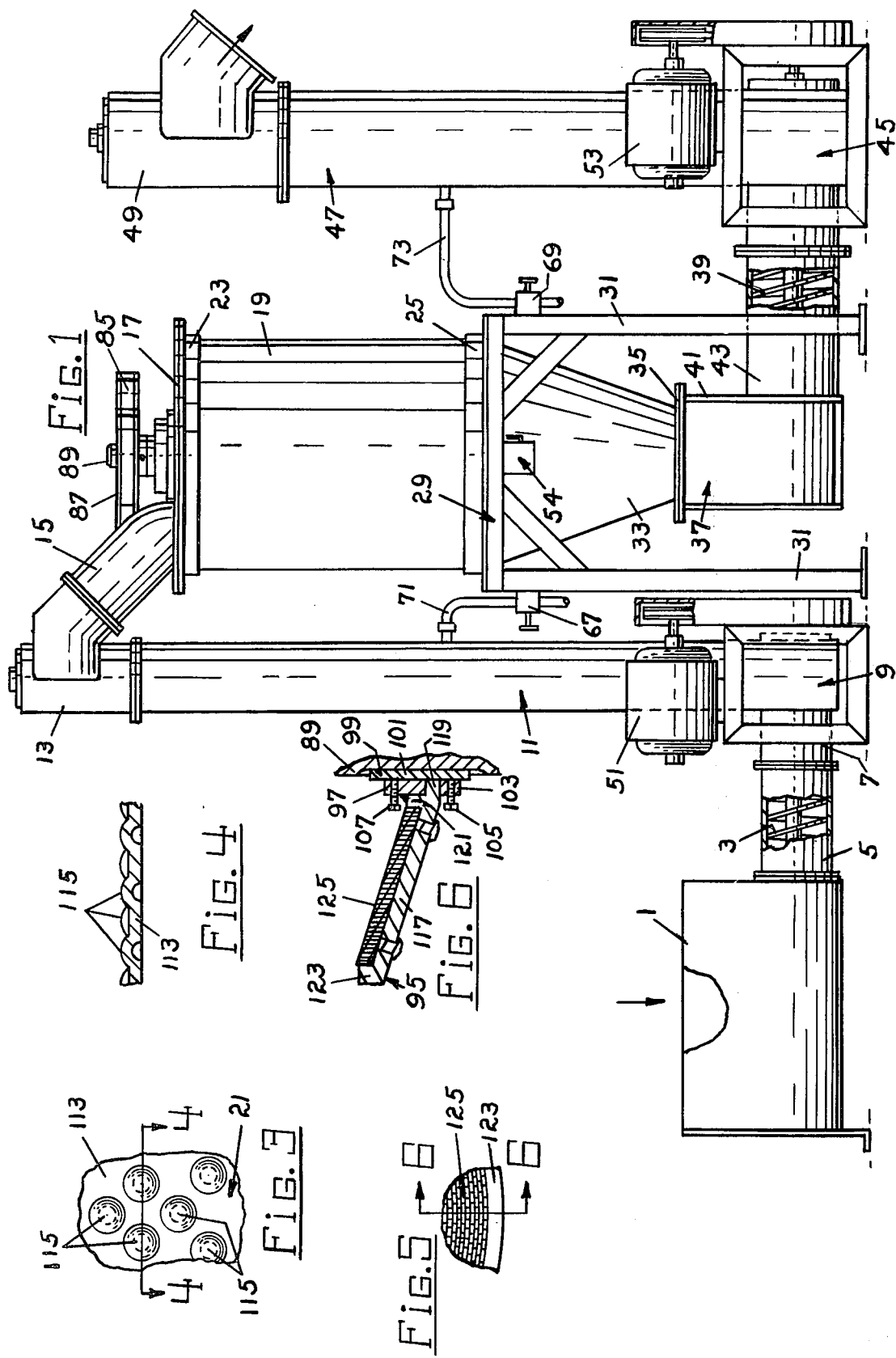
FIG. 1 is an elevation of the machine for executing the process, and which shows the input hopper and auger, the treatment tank, the water injection means, the discharge hopper and auger and the rotor drive means; said input hopper and auger being rotated substantially 90 degrees about the axis of the auger for purposes of illustration.
Figure 2:
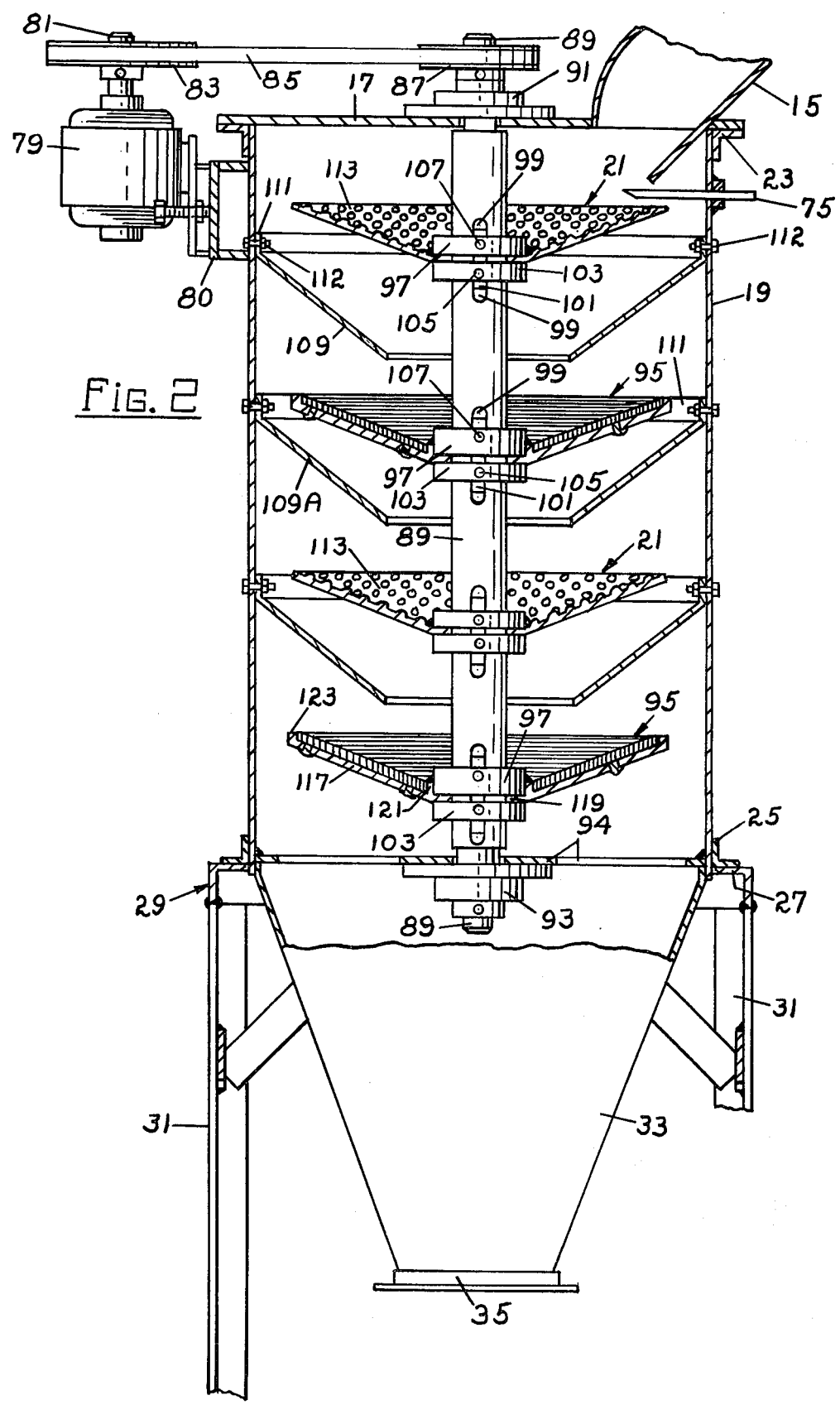
FIG. 2 is a vertical section taken substantially on the vertical axis of the tank to show the disc driving means and general formation of the rotors.

Referring first to FIG. 1, numeral 1 indicates a hopper provided to receive the grain which is to be reconstituted. For the purpose of explanation, the grain to be treated is assumed to be dry, shelled corn, although other grains may be treated in the same manner to produce the desired result. The hopper is generally V-shaped in cross-section and receives one end of a rotary screw or auger 3 which is passed through the right hand end of the hopper. One end of the auger housing 5 is attached to the end wall of the hopper while the other end is attached to the housing 7 of a "power corner" 9 which is, in turn, connected with a vertical auger and housing 11. The latter is surmounted by a discharge "head" 13 and a spout 15 which projects through the top 17 of the tank 19 so as to discharge grain toward the center of the first impacting rotor 21 (FIG. 2).

The tank is cylindrical and its upper end is surrounded by and is fixed to the vertically depending leg of a circular angle member 23. The tank top or cover 17 is removably attached to the radially outward extending flange of member 23.

The lower end of the tank is fixed to the upwardly extending leg of a member 25, which is similar to 23, and the radial flange of 25 is fixed to the inwardly directed flanges 27 of a frame 29 which is supported at a predetermined level by a number of legs 31.

The tank has an inverted frustoconical spout 33 fitted to and supported on its lower end. The smaller diametered, lower end of the spout is surrounded by another circular angle member 35 which is similar to 25 but of smaller diameter. The radial flange of member 35 is adapted to mate with the top cover of a discharge hopper 37. A discharge auger 39 is received in the hopper and one wall 41 of the hopper is fixed to the auger housing 43.

Again, the discharge end of the horizontal auger 39 is connected through a power corner 45 to the inlet of a vertical auger 47, which is surmounted by a discharge head 49, to which any desired form of discharge spout (not shown) may be attached. If desired, additional conveying means may be used to deliver the processed grain to the feeding site or other convenient location.

The hopper 1, conveyors 3 and 11, power corner 9 and discharge head 13 are commercially available from Cardinal Division, LML Engr. & Mfg. Corp., Columbia City, Indiana, and the six inch size thereof is preferred for a reconstituting apparatus which is rated to produce five tons of reconstituted grain per hour. The discharge system which comprises hopper 37, augers 39, 47, power corner 45 and head 49, for the same apparatus and rating, is preferably the eight inch size produced by the same manufacturer. The augers for the input system are driven by an electric motor 51 through the drive train contained in the power corner 9, while the output augers are driven by motor 53 and power corner 45.

Referring to FIG. 8, water under pressure is supplied to line 55 and passes through a ball valve 57, the disc handle of which is graduated and which is rotated relative to a fixed pointer 61 to indicate, with reasonable accuracy, the rate of flow (G.P.H.) of water through the valve at various settings of the handle relative to the pointer. A conduit 63 connects the outlet of the valve to a tee 65, the two outlets from which are connected through gate or other suitable, adjustable valves 67, 69 respectively, each of which discharges through a separate hose or other conduit 71, 73. As shown in FIG. 1, the hose 71 is connected to the casing of the input auger 11 at a point which is about midway of its vertical height. The hose 73 is similarly connected with the housing of the discharge auger 47. Accordingly, the total rate of flow can be established by adjusting the ball valve 57 and the rate of total flow can be apportioned between the input and output augers.

In some installations, the discharge auger 47 or even the entire discharge apparatus including the hopper 37 is not wanted by the customer, and in such cases, the hose 73 is connected with a nozzle or tube 75 (FIG. 2) which directs the water flowing through this branch into the top end of the tank 19 and preferably onto the top side of the uppermost rotor.

If desired, any of various forms of existing rate of flow meters 77 may be inserted in line 63 to afford a more accurate rate of flow indication than is provided by the indicating valve 57, and in such case any suitable valve may be substituted for that shown and described.

Referring now to FIGS. 2 through 6, tank 19 is provided with a bracket or pad 80 on which is mounted an electric motor 79. The shaft 81 of which extends vertically upwardly, parallel with the vertical central axis of the tank. A pulley 83 is fixed to the shaft and is connected by a belt 85 to drive another pulley 87 which is fixed to the rotor drive shaft 89, which is coaxial with the central axis of the tank. A suitable bearing and shaft supporting structure 91 is mounted on the top or cover 17 of the tank and a similar structure 93 is mounted on a spider 94 which spans the bottom opening of the tank. The bearings, which are mounted in the supporting structures, are preferably sealed, radial and axial thrust ball bearings.

All of the rotors are mounted on and fastened to the shaft in substantially the same manner. As shown in FIGS. 2 and 6, the rotor 95, which happens to be a scarifying rotor, has a hub portion (not shown) which is welded to a central collar 97. The collar has an internal keyway (not shown) while the shaft has an external one 99 to receive the key 101. The shaft keyway is longer than the vertical height of the combined element hub and collar 97, so that a locating collar 103, which also has an internal keyway, adapted to receive the same key 101, has a screw 105 passed through it so as to clamp the collar and key to the shaft. Thus, when the rotor is slipped onto the shaft and lowered into engagement with the locating collar, seating the key, the rotor will occupy its intended level in the stack. A screw 107 also enters collar 97 to clamp the rotor to the shaft.

Referring to FIGS. 2, 3, and 4, one or more sets of rotors are used in the apparatus and each set comprises an impacting rotor 21 disposed above and in vertically spaced relation to its associated scarifying rotor 95. The grain which is thrown laterally along the surface of the rotor 21, strikes the inner wall of the tank and drops downwardly. It must be returned toward the central portion of the scarifying rotor of this set and this function is performed by an inverted frustoconical funnel 109. The upper end of the funnel has an axially and upwardly extending flange 111 which fits relatively snugly within the wall of the tank and is held in place therein by bolts 112 or other suitable removable fasteners. If a second set of rotors is used, another funnel 109A will be required to direct the grain from the second rotor of the first set to the first rotor of the next set. No additional funnel is required below the last rotor since the discharge spout 33 will direct the grain to the hopper 37.

All of the impacting rotors are alike. The main or bowl portion 113 of this rotor is made from flat stock which has a "pimple" finish, the "pimples" 115 being the rounded or spherical surface projections shown in FIGS. 3 and 4. The central portion of the "bowl" is flattened so as to accept the collars 97 and 103 and is perforated so as to accept the shaft 89. The bowl is formed substantially as the frustum of a cone having an apex angle of about 160°.

The scarifying rotors (FIGS. 2, 5 and 6) are also alike. The bowl or main portion 117 of this rotor comprises a generally frustoconical casting which has an apex angle of about 160°. It has a radial, inwardly directed flange 119 to fit against the collars 97, 103 and inner and outer, axially extending circular flanges 121, 123. The internal diameter of flange 121 is such that it will receive the lower end of collar 97 to which it is welded.

The scarifying or blister opening means 125 is preferably a band saw blade which is tightly coiled in a spiral so that the sides of the blade will be parallel with the inner and outer wall of the axial flanges 123, 121, respectively, which confine the blade, and so that the bottom or back edge of the blade will rest on and be supported by the upper, conical surface of the bowl portion 117 of the casting. This portion of the casting is pierced by a number of holes which are disposed in a somewhat random pattern, but which range laterally from flange 121 to 123 and are also distributed circularly with respect to the axis of the rotor. These holes admit a welding rod which is used to tack the back edges of the blade to the casting in numerous places. This, together with the friction resulting from the tightly wound condition of the coiled blade, holds the blade in place on the rotor.

The teeth of the blade extend axially upwardly and the upper ends of the teeth of each outer coil project slightly above those of the next inwardly adjacent coil. The blade is also preferably coiled so that the teeth face in the direction of rotation of the rotor so that they will be in cutting position relative to the kernels which are moving radially with respect to the coils of the blade.

As shown in FIG. 7, all three motors 79, 51 and 53 are connected in parallel across a switch 54 which may be connected to either a 115 or 230 VAC main; depending upon the motors which are supplied for the system. Accordingly, the motors for the augers and for the rotor will be started and stopped simultaneously.

FIGS. 9 and 9A are sketches which represent a kernel of corn 127 which has been discharged from the impacting rotor 21 and thrown against the inner wall of the tank. The numeral 129 represents the partially plasticized hull which has been partially detached from the starch matrix 131 so as to form blisters 133. FIGS. 10 and 10A show a kernel of corn which has been discharged from the scarifying rotor 95 after perforation of the blisters, such perforations or holes being indicated by the numeral 135. It should be noted that the areas of the matrix which is thus exposed to water added through hose 73 is materially greater than the total area of the holes 135 per se. Accordingly, such a relatively large area enables the starch matrix to be thoroughly and rapidly and substantially uniformly moistened even in the areas where the hull still clings to the matrix, as well as in the germ and aleurone areas. Also, since only the hull has been deformed in the process, the enzyme generating and transmission systems of the kernel have not been seriously impaired or destroyed.

OPERATION

The description of operation of the apparatus will also explain the steps of the process in detail.

Since the dry grain will have varying percentages of moisture, the actual moisture content should be determined at the outset of the reconstituting operation. The percentage of moisture desired in the reconstituted grain should also be established. These two factors, together with the rate of operation or capacity of the apparatus enable the rate of flow of water through the valve 57 to be determined.

To illustrate this calculation, it is assumed that grain to be treated has a moisture content of 11% by weight and that it is to be reconstituted to 36% by weight. The capacity or through-put of the apparatus is 5 tons of grain an hour but only 3 tons are to be processed.

The total amount of water desired in the treated grain is 0.36 × 6000 which equals 2160 lbs. The amount already in the grain is 0.11 × 6000 or 660 lbs. The difference of 1500 lbs., must then be added to the grain within a period of 0.6 hours.

1500 lbs. divided by 62.5 lb./cu.ft. (the weight of a cubic foot of water) equals 24 cu. ft. to be added in 0.6 hours or 36 minutes. Thus, the rate of flow of water through valve 57 will be 24 cu. ft. divided by 36 minutes or 0.66 cu. ft./minute.

Since the graduations on the handle 59 of the valve are in terms of gallons and decimal fractions thereof, the result 0.66 cu.ft./min. must be multiplied by 7.5 gal/cu.ft. to determine the setting of the graduations with respect to the indicator 61. The setting is 4.95 gals./minute.

About 15% of the flow is delivered through valve 67 and conduit 71 to the input auger and 85% is delivered through valve 69 and conduit 73 to the discharge auger or to the top of the tank. The flows will be approximately 0.74 and 4.2 gpm respectively. Since these percentages are used whenever the machine is operated, the valves, when they are once set, generally do not require resetting. In case of doubt, the actual moisture content of the processed grain can be easily checked and compensating adjustments can be easily made, as soon as the first of the treated grain is discharged.

Antibiotics and food supplements which are soluble in water may be mixed with the water which is supplied to the ball valve. While the water which flows through this valve is divided downstream thereof, the tempering water reaches the tank and is discharged with the treated grain and is not washed. However, if this is not deemed to be desirable, a separate injection system may be provided for these materials so that they may be introduced directly into the tank or the discharge auger.

As to the rotational speed of the rotors, applicant has found that in reconstituting shelled corn using 15 inch rotors, a speed of about 2200 rpm provides good results in the blistering and scarifying stages. A speed of 2000 rpm is generally inadequate to cause blistering and materially higher speeds may damage the germ area or shatter the kernels so as to damage or destroy the enzyme releasing and distributing systems of the kernels.

The number of sets of rotors used depends primarily upon the rate at which the grain is fed through the machine, as well as to the kind of grain being processed. Two sets normally suffice at rates up to about 3 tons per hour whereas, for corn at a rate of 5 tons per hour, applicant prefers to use three sets of rotors. A machine rated at 15 tons/hr has been built and produced adequate results with four sets of rotors.

To secure proper perforation of the blisters, a saw blade having 8 to 10 teeth per inch of length is preferred.

As indicated above, the amount of water to be supplied to the machine depends largely upon the moisture content of the grain as it was taken from the elevator or other storage and the moisture content desired in the final product. The elevator grain moisture content may vary from about 8 to 15% by weight. The reconstituted corn may be produced so that it will have a range of from 22 to 40% moisture. It appears that 22% is the minimum which will cause secretion of the enzymes (See Release 2565). In applicant's experience, little effect has been noted when the content is raised above 36% by weight. His experience also indicates that the amount of water used to temper the grain ought not exceed 15% of the total added and may be somewhat lower than this figure. In the case of shelled corn, the particular hybrid being processed may enable a lesser amount to be used in tempering the grain.

Regardless of the kind of grain being processed, the first of the processed grain delivered from the machine should be examined to determine its condition, so that adjustments may be made to produce the desired degree of reconstitution.

While air tight storage is not required if the time which elapses between the reconstitution and the feeding of the grain is relatively short, it may be necessary, in some commercial operations, to process the grain for feeding after or during a prolonged period. This could result in deterioration or spoilage and in such case, air tight storage might be needed. In any case in which ensiling the reconstituted grain is practical, processing the grain in accordance with this invention would provide accurate moisture content of the grain and would reduce materially, the ten day period before the grain can be fed to the best advantage.

Applicant's invention will also shorten the time required to dry grain to a predetermined moisture content for storage, because the perforations will enable the rapid escape of the unwanted moisture. In such process, the addition of the tempering water would probably be required to form the blisters but no additional water should be added to the tank or to the discharge auger.

While applicant has disclosed a specific process in order to illustrate the invention, he does not wish to be limited strictly thereto, but desires all protection which falls fairly within the scope of the appended claims.

What is claimed is:

1. A process for treating whole kernels of feed grain, comprising the steps of:
   introducing whole kernels of feed grain into a treating area with said kernels having plasticized hulls enclosing interior portions;
   contacting said whole kernels of feed grain at said treating area with blunt projections on a first movable element to loosen portions of the hulls from the interior portions of the kernels to cause the hulls to blister;
   thereafter contacting said kernels that have been blistered by contact with the blunt projections on said first movable element with cutting members on a second movable element to open said blisters to perforate the hulls substantially without shattering the kernels and substantially without removing the hulls; and
   discharging treated kernels from said treating area.

2. The process of claim 1 wherein said kernels have a low moisture content, which includes, as a first step, moistening the exterior of the kernels prior to loosening the hulls, so as to render portions of the hulls plastic to promote blistering thereof.

3. The process of claim 1 wherein said kernels have a low moisture content which comprises the step of applying moisture to the interior of the kernels through said perforations.

4. The process of claim 2 which comprises the step of applying moisture to the interior of the kernels through said perforations.

5. The process of claim 1 wherein said kernels have a high moisture content, which includes the step of drying the perforated kernels.

6. The process of claim 5 which includes the step of moistening the exterior of the kernels prior to loosening the hulls, to render portions of the hulls plastic to promote blistering thereof.

7. The process of claim 3 which includes storing the processed grain in the absence of air.

8. The process of claim 2 which includes subjecting the moistened kernels to a series of impacts to loosen and blister the hulls thereof.

9. The process of claim 8 which includes subjecting the kernels having blistered hulls to a series of contacts by said cutting members to open the blisters.

10. The process of claim 4 wherein said moisture is in the form of water.

11. The process of claim 10 wherein said water contains an antibiotic substance in solution.

12. The process of claim 10 wherein the water contains a food supplement in solution.

13. The process of claim 4 wherein the total amount of moisture added to the kernels is such as to increase the moisture content of the kernels to a percentage in the range of 22% to 40% by weight.

14. The process of claim 4 wherein the total amount of moisture added to the kernels is such as to increase the moisture content of the kernels to substantially 36% by weight.

15. The process of claim 13 wherein the amount of moisture applied to the exterior of the kernels is approximately 15% by weight, of the total amount of moisture to be added to the grain and that applied through the perforations is approximately 85% of said total amount.

16. A process for treating whole kernels of feed grain, said process comprising:
   providing a treating area;
   introducing whole kernels of feed grain into said treating area;
   supplying water to said whole kernels of feed grain introduced into said treating area so that said kernels having water supplied thereto have plasticized hulls enclosing interior portions when in said treating area;
   contacting said whole kernels of feed grain in said treating area with blunt projections on a first movable element to loosen portions of the hull from the interior portions of the kernels to cause the hulls to blister;
   thereafter contacting said kernels that have been blistered by contact with the blunt projections on said first movable element with cutting members on a second movable element to open said blisters to thereby perforate the hulls substantially without shattering the kernels and substantially without removing the hulls;
   applying water to said interior portions of said kernels of feed grain through said perforated blisters therein; and
   removing said kernels with said perforated hulls from said treating area.

17. The process of claim 16 wherein said portions of the hulls are loosened from the interior portions of the kernels by impacting the kernels with blunt elements.

18. The process of claim 16 wherein said blisters are opened to perforate the hulls by impacting the kernels with scarifying elements.

19. The process of claim 16 wherein said kernels are directed within said treating area so that the steps of blistering the hulls and perforating the same are repeatedly carried out in successive steps.

20. A process for treating whole kernels of feed grain, said process comprising:
   introducing kernels of feed grain into a treating area;
   applying water to the exterior of said hulls of kernels within said treating area to plasticize said hulls so that said kernels have plasticized hulls enclosing interior portions when in said treating area;
   loosening portions of the hulls that have been plasticized from the interior portions by repeatedly impacting said hulls with blunt elements at said treating area to cause blistering of said hulls; perforating said blisters on said hulls by repeatedly impacting said blistered hulls with scarifying elements at said treating area substantially without shattering the hulls and substantially without removing the hulls;
   supplying water to said interior portions of said kernels of feed grain through said perforated blisters therein, said water supplied to said whole kernels of feed grain and supplied to said interior portions of said kernels of feed grain being supplied from a source that is adjustable with respect to total rate of flow and so that the total weight of water supplied per unit of time is equal to the difference between the total weight of water intended to be contained in the fully treated kernels delivered from the treating area during such unit time and the total weight of water contained in the untreated kernels which are introduced into the treating area during such unit of time; and
   removing said kernels from said treating area after the hulls have been blistered, the blisters perforated, and water applied.

* * * * *